(12) United States Patent
Wain et al.

(10) Patent No.: US 6,298,197 B1
(45) Date of Patent: *Oct. 2, 2001

(54) AUTOMATIC PHOTOBOOTH WITH ELECTRONIC IMAGING CAMERA

(75) Inventors: John Laurence Wain, Cheadle Hulme; Barry Allen Marchini, Hale; Richard Layton Fry, Harston, all of (GB)

(73) Assignee: Photostar Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/345,794

(22) Filed: Nov. 22, 1994

Related U.S. Application Data

(63) Continuation of application No. 07/752,581, filed on Aug. 28, 1991, now abandoned.

(30) Foreign Application Priority Data

Feb. 28, 1989 (GB) .................................................... 8904535
Feb. 27, 1990 (WO) ................................... PCT/GB90/00306

(51) Int. Cl.[7] .................................................. G03B 15/00
(52) U.S. Cl. ................................. 396/2; 345/326; 348/61
(58) Field of Search ............................... 354/75, 76, 290, 354/291; 396/1–3, 429; 348/61, 571, 584; 345/418, 112–115, 326, 333, 339, 352, 501

(56) References Cited

U.S. PATENT DOCUMENTS

| Re. 32,115 | 4/1986 | Lockwood et al. .................. 235/381 |
| 1,933,953 | 11/1933 | Ames ........................................ 95/36 |
| 1,988,522 | 1/1935 | Stanley ..................................... 85/24 |
| 2,073,370 | 3/1937 | Goldsmith ................................ 178/6 |
| 2,172,936 | 9/1939 | Goldsmith ............................. 178/7.2 |

(List continued on next page.)

FOREIGN PATENT DOCUMENTS

| 1278862 | 1/1991 | (CA) ............................... G10L/3/00 |
| 482219 | * | 1/1970 | (CH) . |
| 2301299 | * | 7/1978 | (DE) . |

(List continued on next page.)

OTHER PUBLICATIONS

Clare Ansberry, "On Photography", The Wall Street Journal—Marketing Sep. 26, 1988.
Unknown, Kodakery, Aut. 11, 1988.
News Release, "Kodak Color Printer Gains Support for Broad Base of Graphics Applications", Aug. 1, 1988.
News Release, "Kodak Highlights Electronic Photography at Video Expo", Dec. 10, 1987.
Public Relations Release, Polaroid Corporation, "Instant Entrepreneurial Opportunities Await at Polaroid Expressions, Unique Instant Photo Store Opens on Pier 39", Jul. 15, 1987, San Francisco, CA.
Brochure, Amazing Photos, Inc., "The Amazing Photo Booth", 1987, Santa Monica, CA.
Brochure, Practically Perfect Productions, Inc. "People Postcards", 1988, Del Mar, CA.

Primary Examiner—David M. Gray
(74) Attorney, Agent, or Firm—Hollander Law Firm, P.L.C.

(57) ABSTRACT

An automatic picture taking system has a housing which may be in the form of a booth. The housing contains a video camera and is arranged to produce a video picture of a subject in a picture taking zone. The video picture can be converted to a print e.g. using a digital thermal color printer. The video picture is stored in memory and can be processed to give a desired composition prior to printing. The picture may consist of the image of the subject which is separated from the background using chroma keying and which is then combined with a selected electronically prestored background or foreground.

36 Claims, 7 Drawing Sheets

U.S. PATENT DOCUMENTS

| | | | |
|---|---|---|---|
| 3,398,664 | 8/1968 | Bonatsos | 95/14 |
| 3,609,250 | 9/1971 | Morris | 179/100 |
| 3,631,781 | 1/1972 | Kennington et al. | 95/14 |
| 3,683,781 | 8/1972 | Allen | 95/94 R |
| 3,800,932 | 4/1974 | Dana | 194/10 |
| 3,864,708 | 2/1975 | Allen | 354/290 |
| 3,892,427 | 7/1975 | Kraynak et al. | 281/15 R |
| 3,982,744 | 9/1976 | Kraynak et al. | 270/12 |
| 3,990,710 | 11/1976 | Hughes | 274/1 R |
| 4,007,487 | 2/1977 | Vlahos | 358/22 |
| 4,037,249 | 7/1977 | Pugsley | 358/76 |
| 4,052,739 | 10/1977 | Wada et al. | 358/299 |
| 4,070,698 | 1/1978 | Curtis et al. | 360/12 |
| 4,100,569 | 7/1978 | Vlahos | 358/22 |
| 4,130,834 | 12/1978 | Mender et al. | 358/127 |
| 4,239,380 | 12/1980 | oldsholl | 355/52 |
| 4,240,104 | 12/1980 | Taylor et al. | 358/22 |
| 4,258,385 | 3/1981 | Greenberg et al. | 358/22 |
| 4,261,012 | 4/1981 | Maloomian | 358/93 |
| 4,297,724 | 10/1981 | Masuda et al. | 358/93 |
| 4,317,114 | 2/1982 | Walker | 340/721 |
| 4,344,085 | 8/1982 | Vlahos | 358/22 |
| 4,345,276 | 8/1982 | Colomb | 358/258 |
| 4,357,624 * | 11/1982 | Greenberg | 358/22 |
| 4,359,631 | 11/1982 | Lockwood | 235/381 |
| 4,393,394 * | 7/1983 | McCoy | 358/22 |
| 4,409,618 | 10/1983 | Inaba et al. | 358/183 |
| 4,412,292 | 10/1983 | Sedam et al. | 364/479 |
| 4,435,772 | 3/1984 | Suzuki et al. | 364/520 |
| 4,439,783 | 3/1984 | Nishikawa et al. | 358/22 |
| 4,459,676 | 7/1984 | Oguchi | 364/521 |
| 4,460,634 | 7/1984 | Hasegawa et al. | 428/124 |
| 4,463,380 | 7/1984 | Hooks, Jr. | 358/160 |
| 4,467,349 * | 8/1984 | Maloomian | 358/93 |
| 4,488,244 | 12/1984 | Freeman | 364/525 |
| 4,489,389 | 12/1984 | Beckwith et al. | 364/522 |
| 4,506,289 | 3/1985 | Shirakami | 358/22 |
| 4,530,009 | 7/1985 | Mizokawa | 358/183 |
| 4,539,585 | 9/1985 | Spackova et al. | 358/93 |
| 4,561,061 | 12/1985 | Sakamoto et al. | 364/550 |
| 4,602,280 | 7/1986 | Maloomian | 358/93 |
| 4,602,286 | 7/1986 | Kellar et al. | 358/183 |
| 4,603,966 | 8/1986 | Brownstein | 355/45 |
| 4,616,926 | 10/1986 | DiPietro et al. | 355/45 |
| 4,641,197 | 2/1987 | Miyagi | 358/280 |
| 4,672,683 | 6/1987 | Matsueda | 382/57 |
| 4,677,460 | 6/1987 | Foss et al. | 358/22 |
| 4,683,536 | 7/1987 | Yamamoto et al. | 364/408 |
| 4,687,526 | 8/1987 | Wilfert | 156/64 |
| 4,688,105 | 8/1987 | Bloch et al. | 358/335 |
| 4,694,329 | 9/1987 | Belmares-Sarabia et al. | 358/22 |
| 4,695,142 | 9/1987 | Holt | 354/76 |
| 4,711,543 | 12/1987 | Blair et al. | 352/87 |
| 4,712,909 | 12/1987 | Oshikoshi | 355/20 |
| 4,714,957 | 12/1987 | Takano | 358/93 |
| 4,714,962 | 12/1987 | Levine | 358/209 |
| 4,727,589 | 2/1988 | Hirose et al. | 382/56 |
| 4,730,260 | 3/1988 | Mori et al. | |
| 4,731,743 | 3/1988 | Blancato | 364/521 |
| 4,736,306 | 4/1988 | Christensen et al. | 364/513 |
| 4,738,526 | 4/1988 | Larish | 354/412 |
| 4,740,904 | 4/1988 | Nagle | 364/520 |
| 4,755,935 | 7/1988 | Yourick | 364/401 |
| 4,769,694 | 9/1988 | Oshikoshi | 358/75 |
| 4,786,944 | 11/1988 | Sakamoto et al. | 355/20 |
| 4,789,147 | 12/1988 | Berger et al. | 270/1.1 |
| 4,789,907 | 12/1988 | Fischetti et al. | 360/33.1 |
| 4,796,180 | 1/1989 | Riley et al. | 364/400 |
| 4,804,983 * | 2/1989 | Thayer, Jr. | 354/76 |
| 4,805,037 | 2/1989 | Noble | 358/335 |
| 4,817,043 | 3/1989 | Brown | 364/518 |
| 4,818,854 | 4/1989 | Davies et al. | 235/381 |
| 4,821,307 | 4/1989 | Flint, III | 379/53 |
| 4,823,285 | 4/1989 | Blancato | 364/521 |
| 4,825,295 | 4/1989 | Ishikawa et al. | 358/254 |
| 4,827,344 | 5/1989 | Astle et al. | 358/183 |
| 4,827,347 * | 5/1989 | Bell | 358/909 X |
| 4,835,563 | 5/1989 | Larish | 354/412 |
| 4,841,378 | 6/1989 | Cogert | 358/335 |
| 4,852,013 | 7/1989 | Durst, Jr. et al. | 364/478 |
| 4,862,200 | 8/1989 | Hicks | 354/75 |
| 4,864,410 * | 9/1989 | Andrews et al. | 358/909 X |
| 4,872,056 | 10/1989 | Hicks et al. | 358/183 |
| 4,873,643 | 10/1989 | Powell et al. | 364/468 |
| 4,891,660 | 1/1990 | Biondo, Jr. | 354/412 |
| 4,896,175 | 1/1990 | Thayer, Jr. | 354/76 |
| 4,896,208 | 1/1990 | Moriya et al. | 358/78 |
| 4,903,057 | 2/1990 | Yamamoto et al. | 354/88 |
| 4,910,661 | 3/1990 | Barth et al. | 364/167.01 |
| 4,929,972 | 5/1990 | Anderson et al. | 354/75 |
| 4,965,673 | 10/1990 | Bozzo et al. | 358/335 |
| 4,982,343 | 1/1991 | Hourvitz et al. | 364/521 |
| 4,999,065 | 3/1991 | Wilfert | 156/64 |
| 5,018,085 | 5/1991 | Smith, Jr. | 364/526 |
| 5,023,638 * | 6/1991 | Siegesleuthner et al. | 354/290 X |
| 5,038,213 * | 8/1991 | Yoda | 358/909 X |
| 5,109,242 * | 4/1992 | Massarsky | 354/75 |
| 5,343,386 | 8/1994 | Barber . | |
| B1 4,687,526 | 3/1992 | Wilfert | 156/64 |

FOREIGN PATENT DOCUMENTS

| | | | |
|---|---|---|---|
| 0103759 | 3/1984 | (EP) . | |
| 0233736 | 8/1987 | (EP) . | |
| 0235398 | 9/1987 | (EP) | 1/46 |
| 0269022 | 6/1988 | (EP) . | |
| 0326515 | 2/1989 | (EP) . | |
| 2570843 * | 3/1986 | (FR) . | |
| 1005827 | 9/1965 | (GB) . | |
| 2050106 | 12/1980 | (GB) | 1/46 |
| 2065412 | 6/1981 | (GB) | 1/46 |
| 2078411 | 1/1982 | (GB) . | |
| 2092354 | 8/1982 | (GB) | 9/2 |
| 2105075 | 3/1983 | (GB) . | |
| 2119600 | 11/1983 | (GB) | 1/46 |
| 50-140130 | 11/1975 | (JP) . | |
| 58-157272 | 9/1983 | (JP) | 5/76 |
| 62-59075 | 3/1987 | (JP) | 3/12 |
| 63-174334 | 11/1988 | (JP) . | |
| 1-291944 | 11/1989 | (JP) . | |
| 2-153497 | 6/1990 | (JP) | 17/26 |
| 4-12770 | 1/1992 | (JP) | 5/4 |
| 6-70374 | 9/1994 | (JP) | 5/225 |
| 3014733 | 8/1995 | (JP) | 5/76 |
| WO 90/10251 | 9/1990 | (WO) | 17/53 |

* cited by examiner

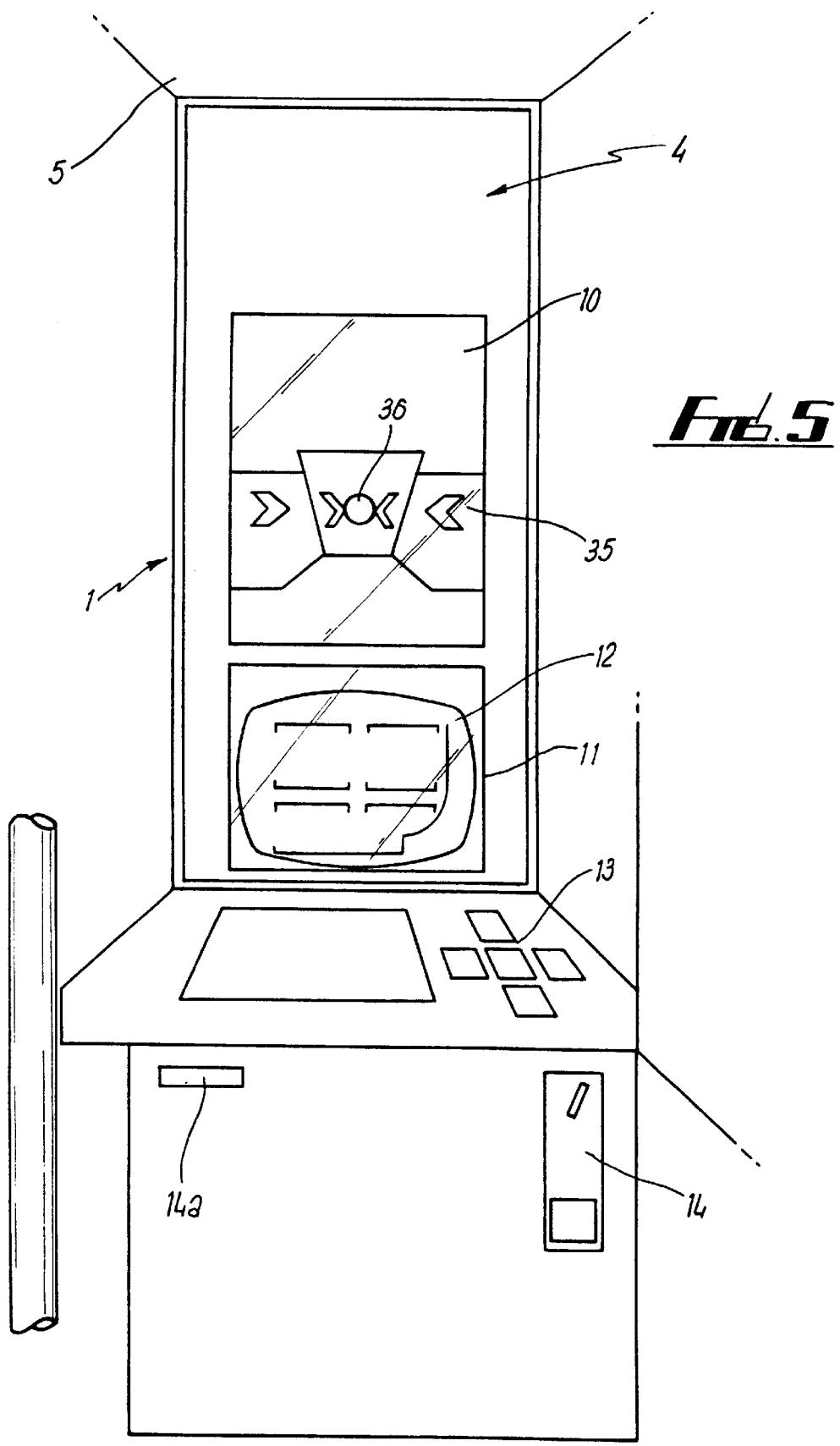

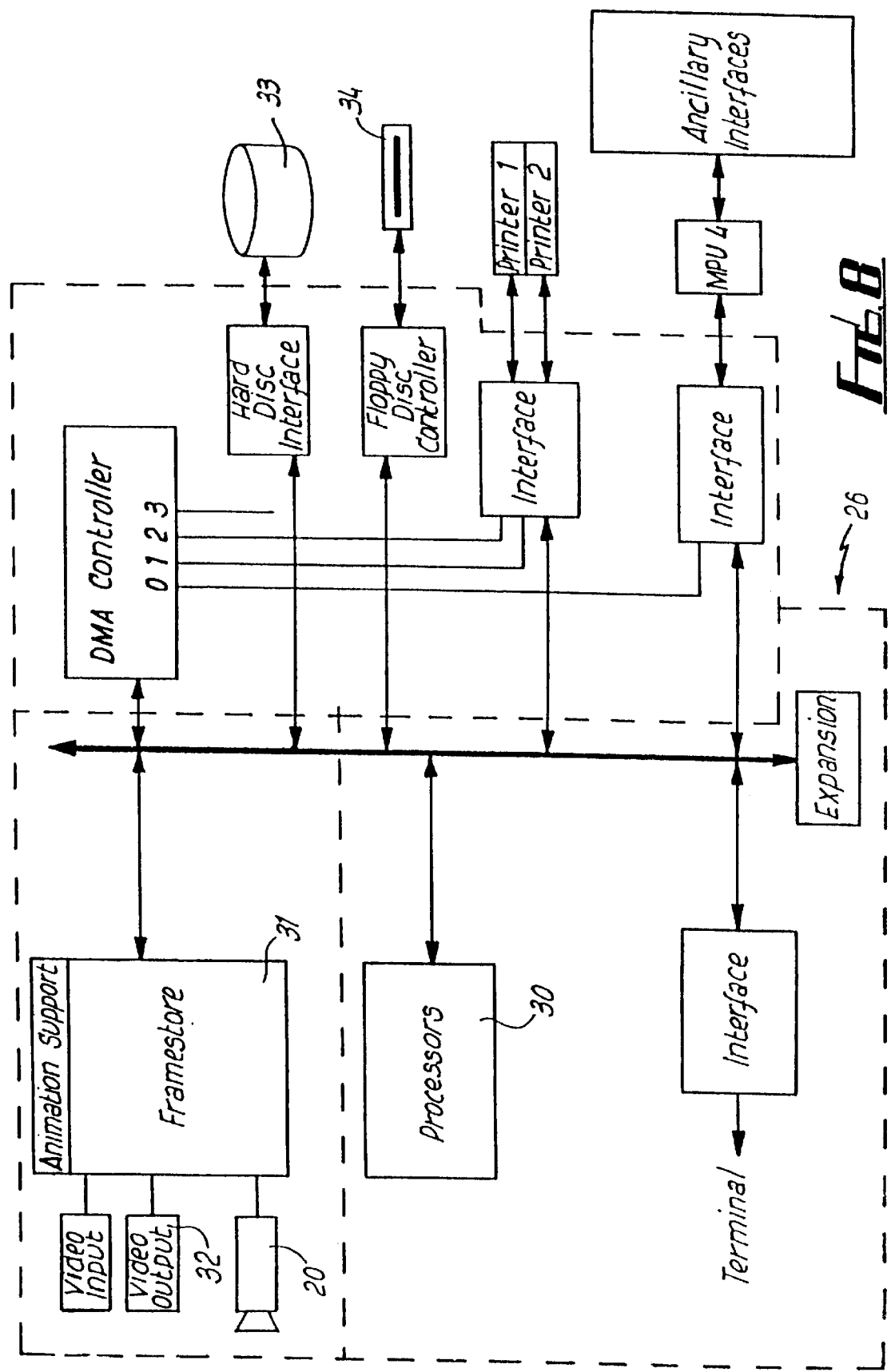

AUTOMATIC PHOTOBOOTH WITH ELECTRONIC IMAGING CAMERA

This application is a continuation of prior U.S. application Ser. No. 07/752,581 filed Aug. 28, 1991 now abandoned, which is a 371 of PCT/GB90/00306, filed Feb. 27, 1990.

TECHNICAL FIELD

This invention relates to a machine, particularly a coin (or token) operated machine, for automatic picture taking.

BACKGROUND ART

Automatic coin operated machines are known for taking pictures of persons for passport or visa photographs or for portrait or other purposes. These known machines comprise a booth containing an adjustable seat positioned in front of a box structure containing a camera concealed behind a reflective glass panel. After actuating the machine by insertion of a coin into a coin mechanism one or more photographs are automatically taken of a person sitting on the seat. The photographs are developed and printed by equipment within the box structure and prints are delivered through a slot in an outer wall of the booth.

With this arrangement, due to the use of a photographic camera and a chemical developing and printing process, limitations are imposed, in practice, on the versatility of the machine and the speed with which prints of pictures taken can be delivered to the user.

An object of the present invention is to provide an improved automatic picture taking machine with which it is possible to achieve considerable versatility and fast picture delivery.

DISCLOSURE OF THE INVENTION

According to the invention therefore there is provided an automatic picture taking system comprising a housing containing a camera and an automatic apparatus which when actuated causes the camera to take at least one picture of a subject located in a zone near to the housing and to provide a print-producing output, and a printer arranged to be operated by said output to produce a print of such picture, characterised in that the camera comprises an electronic imaging camera which produces an image output in the form of storable electronic data, said automatic apparatus includes a control system for storing and processing said data, and said printer is adapted to produce a print corresponding to said stored and processed electronic data.

With this arrangement, due to the use of the electronic imaging camera and the printer, prints can be produced quickly, and there is much scope for versatility arising from the ability to process the electronic image data prior to production of the prints therefrom.

The printer may be mounted within the housing and produced prints may be supplied at an outlet in the housing. Other arrangements are possible and, for example, the printer may be separate from the housing and may be connected remotely to the control system via a lead or other data-transfer link (e.g. a telephone link or radiation link). Further, the control system may supply the print-producing output as data stored on a suitable medium such as a magnetic card or disc or tape or solid state memory or other device, such data being transferred to, the printer (which may be remote from the housing) by physical transport of the data storage medium from e.g. an outlet slot in the housing to an input data reader associated with the printer.

With regard to the housing this may take any suitable form.

In one embodiment, the housing has an upstanding box structure containing some or all of the camera, automatic apparatus and printer, with the camera arranged to take the picture of the subject in said picture taking zone in front of a front wall or other outer wall of the box structure which is formed to permit taking of a picture therethrough. This outer wall may consist of or include a mirrored glass or other transparent panel or aperture through which the camera is directed at the zone.

Conveniently the housing may be in the form of a booth with said zone bounded by said outer wall of the upstanding box structure and by one or more further walls defining therewith a partial or complete enclosure. However, the booth configuration is not essential and the box structure may stand alone with the said picture taking zone unbounded and not enclosed.

Where the intended subject is a person, the housing may include a seat mounted in said picture taking zone and this may be height adjustable whereby, for example, the person can align himself with the camera, for example, by aligning his eyes with indications on the aforesaid outer wall of the box structure. It is, however, not essential to provide a height adjustable seat, nor even to provide a seat. In the latter respect, the machine may be intended for use by a person standing in front of the machine. Thus, the housing may be in the form of a console or booth with an adjacent floor area above which is located the picture taking zone, said floor area being a standing area whereby the system is adapted for the taking of a picture of a standing person.

Especially (but not necessarily exclusively) in the case where there is a seat which is not height adjustable, or where no seat is provided, provision may be made for height adjustment of the alignment of the camera (e.g. by mounting the camera and/or an interposed mirror on a drive device). Thus, in one embodiment height adjustment is effected with a movable mirror, and in this case the arrangement may be such that the camera is directed upwardly and the movable mirror is pivotable about an angled position above the camera. Alternatively or additionally the camera may be mounted so that it is movable up and down (e.g. with a motor and worm drive) and/or drivably pivotable. Where a movable camera is used this may be directed generally horizontally directly at the picture-taking zone or indirectly via interposed mirrors.

Other arrangements are also possible and thus the camera may be directed downwardly or in any other disposition.

With regard to the camera this may be of any suitable kind and conveniently may be a scanning video camera of conventional form operating on any desired system. The camera may incorporate an appropriate optical system giving sharp focusing over a suitable range within the intended picture taking zone. The optical alignment of the camera with the subject in the zone may be direct or if desired angular via one or more interposed mirrors.

With regard to the printer this is preferably a printer capable of producing color prints. A suitable printer is of the thermal dye transfer kind where thermally heated 'points' defined by pins or small discrete zones on a surface are activated to transfer dots of color from a substrate to print material. Alternatively other digital data-controllable printers such as an ink jet-printer, a laser printer or the like capable of operating in monochrome or multicolour may be used. If desired two or more printers may be provided to minimise printing delays and/or to minimise 'down time' whilst a supply of printing material is being replenished. Thus, the arrangement may be such that one printer operates first and operation is switched to a second printer when the first printer needs refilling with print material. The arrangement may also be such that the printers are operated at the same time e.g. to speed up production of duplicates. The printers may be provided at the same location or at different locations as desired.

The said automatic apparatus preferably includes a coin or token (or similar) mechanism, that is a mechanism which has to be actuated by insertion of one or more coins (or equivalent credit means such as a coin-type token, or a note or a credit card or the like) before pictures can be taken.

The control system may comprise any suitable computer system with appropriate data storage. Most preferably, the control system further includes a visual display device on which there can be displayed to the user a representation of an image of the subject as obtained with the camera. This facility may be used to assist the user in deciding whether or not the image is satisfactory and is to be printed, and/or for selection of an image from a plurality of images. Alternatively or additionally the facility may be used to enable the image to be modified prior to printing as, for example, by changing the background or foreground, adjusting scale (e.g. reduce, pan or zoom), moving the position of the image relative to a background or foreground, or by special effects such as distorting the image (e.g. to give a 'fat' or 'thin' or 'twisted' image etc.) using optical and/or electronic distortion.

By background is meant an area on which the image is superimposed. By foreground is meant an area having a space into which the image can be inserted.

The visual display device may be a VDU screen on crt apparatus or any other suitable device and may be positioned on the housing in any suitable manner. Thus, the device may be directed into the said picture taking zone so that it can be readily seen in such zone. Alternatively it may be directed externally of the zone so that a person inspecting the device does not have to obstruct the zone whilst doing this. It is also possible to have two or more devices providing the same or different displays so that a person can choose which to use and/or so that one person can use one device for one purpose whilst another person uses another for a different purpose. User controls such as press buttons, a touch screen etc. may be provided on or adjacent the (or at least one) device. The VDU directed into the zone may give an actual mirror reversed image and if desired a control may be provided for switching between these.

The machine described may be used to produce passport type pictures of persons, or portraits, or entertaining compositions where, for example, a person's picture is superimposed on or juxtaposed with an interesting or amusing background or foreground or supplementary picture or decoration or other supplementary representation. One or more electronically stored said supplementary representations may be provided whereby the said electronic data used to produce the print corresponds to combination of a taken picture with the (or one) said representation. Alternatively or additionally it is of course possible to provide a selectable physical backing e.g. curtains drawable across a back part of the picture-taking zone etc. Most preferably a range of electronically stored supplementary representations is provided with provision being made for user selection from the range. These representations may be stored in any suitable manner e.g. on hard disc and provision may be made for changing the stored range e.g. by downloading from floppy disc inserted into a disc drive within the housing or by insertion of ROM or magnetic card or other storage device or by connection to a remote data source via wireless link, electric cable, optical cable or otherwise. Provision may be made if desired for inserting the user's own representations e.g. on video tape. The control system may incorporate a monitoring device for monitoring parameters of the equipment e.g. frequency of usage, type of usage, money (or equivalent) taken, consumption of materials, attempts at tampering, failure of components etc. Where stored representations are provided as mentioned above the monitoring device may be arranged to monitor use of particular representations and this may be associated with a counting device whereby a representation may cease to be available for selection after a predetermined maximum number of selections for that representation has been reached (this being of value where monitoring for payment of copyright licences is required). On reaching the maximum number of selections the arrangement may be such that the representation may become available for re-selection by down loading of more 'availability' for that representation e.g. from a 'fresh' floppy disc or a partially used floppy disc with residual 'availability'.

The control system may also incorporate other features. For example a real time clock may be provided whereby monitoring of machine parameters can be monitored in relation to time and/or changes can be made as a function of time. In the latter respect for example the cost per usage can be changed for different times of the day and/or at different times of the week etc.

Where data is monitored this may be stored so as to be accessible at the equipment (e.g. by plugging in a reader or by visually inspecting meters in the equipment). Alternatively or additionally the data may be provided on a data store (e.g. disc etc) which can be removed from the machine for reading elsewhere and/or the data may be made available by remote transmission on-line or otherwise. The data may also be made accessible by printing out using the said picture printer of the apparatus or an additional printer. Similarly, instruction data etc. may be transferable to the control system physically (by insertion of a disc, operation of switches etc.) or by remote transmission on-line or otherwise.

The produced prints may be individual prints or combined prints, and printing may be effected on paper or card or on any other suitable material intended for any suitable purpose. The prints may be on id cards, postcards or any other suitable substrates. The substrate may be pre-formed e.g. pre-printed with associated material (e.g. a card pre-printed with postcard markings on one side). Alternatively or additionally the substrate may be printed by the system of the invention e.g. by the said printer. For exmaple, where id cards are being produced the printer may print the id information alongside the picture.

The printed id information may be standardised and/or may comprise information entered e.g. by a keyboard associated with or connected to the apparatus.

Alternatively or additionally the print output may be in the form of a video or digital or other recording of a static or moving nature. For example, the user may be provided with a video tape or computer disc etc showing the taken picture e.g. on top of a suitable background generated by the machine or provided by the user.

The picture taken in the picture-taking zone may be utilised in its entirety to generate the finished print. Alternatively and preferably the picture taken may be modified by removal of portions to isolate a desired image, only the isolated image being used to generate the finished print (in combination with any electronically added supplementary representation as mentioned above). Isolation may be achieved in any suitable manner although preferably a background boundary surface is provided to said picture-taking zone, said boundary surface being of predetermined chroma characteristics and said apparatus incorporating a chroma key filter device whereby said subject is separated from the background boundary surface in said picture as taken by the camera. The boundary surface may be blue or green or any other suitable colour which is unlikely to appear significantly in the subject. Most preferably to achieve good separation the boundary surface is well (and evenly) illuminated. Thus, the surface may comprise a back-lit coloured translucent wall (e.g. formed from plastics such as Perspex). To achieve special affects overlay pieces of material in the predetermined colour may be used to blank out selected portions of the subject.

The machine may incorporate automatic adjustment functions, especially where a chroma key is used as described above. Thus, for example, on power-up (or otherwise) the camera may be automatically adjusted or calibrated e.g. by utilisation of the known characteristics of the above mentioned coloured backing surface. Also, automatic height adjustment can be achieved (or assisted) e.g. by hunting for the separation between the known characteristics of the coloured backing surface and the top part (or boundary) of the different coloured subject.

The machine may include auxiliary features e.g. for user assistance, advertising or promotion. Thus, there may be a video display and/or audio sequence and/or illuminated notices etc. The machine may operate in an 'attract' mode giving visual and/or audible explanations or promotions. User instructions may be given audibly during use. Separate video/audio presentations may be given respectively in the picture-taking zone and externally thereof.

Whilst it is visualised that the picture-taking zone may be configured to permit picture taking of the upper part (e.g. head and shoulders) of a persons body (or perhaps a small group of persons) it is possible to arrange for a larger picture, e.g. a full length picture of a person, to be taken by appropriate expansion of the zone and/or by appropriate optical or electronic control of the camera and/or by use of multiple cameras etc.

BRIEF DESCRIPTION OF THE DRAWINGS

The invention will now be described further by way of example only and with reference to the accompanying drawings in which:

FIGS. 5 & 6 are internal elevational views of the machine;

FIG. 8 is a schematic block circuit diagram for the machine.

DESCRIPTION OF THE PREFERRED EMBODIMENT

Figure 1:
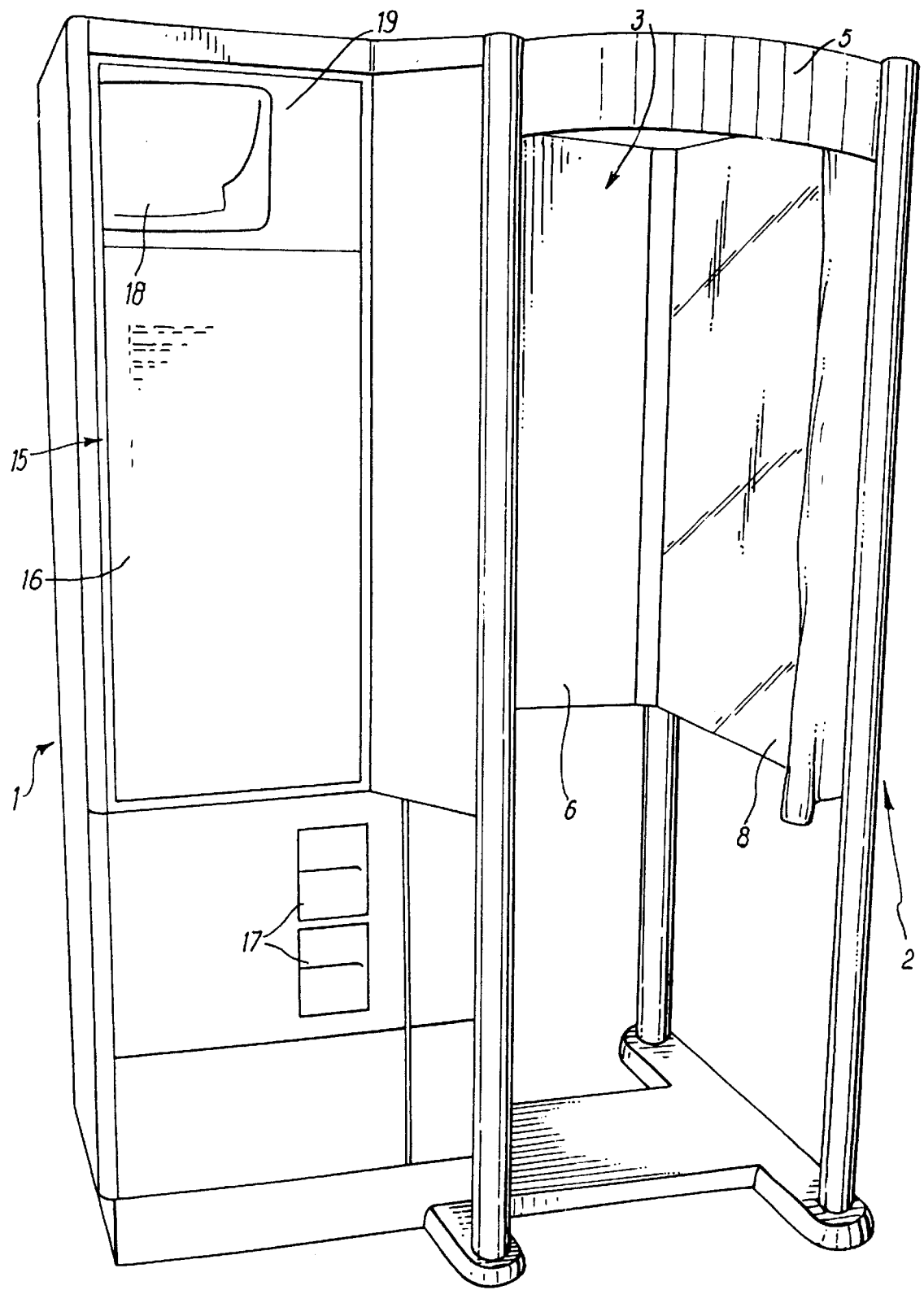
FIGS. 1 & 2 are diagrammatic perspective views of one form of a machine according to the invention.
Figure 2:
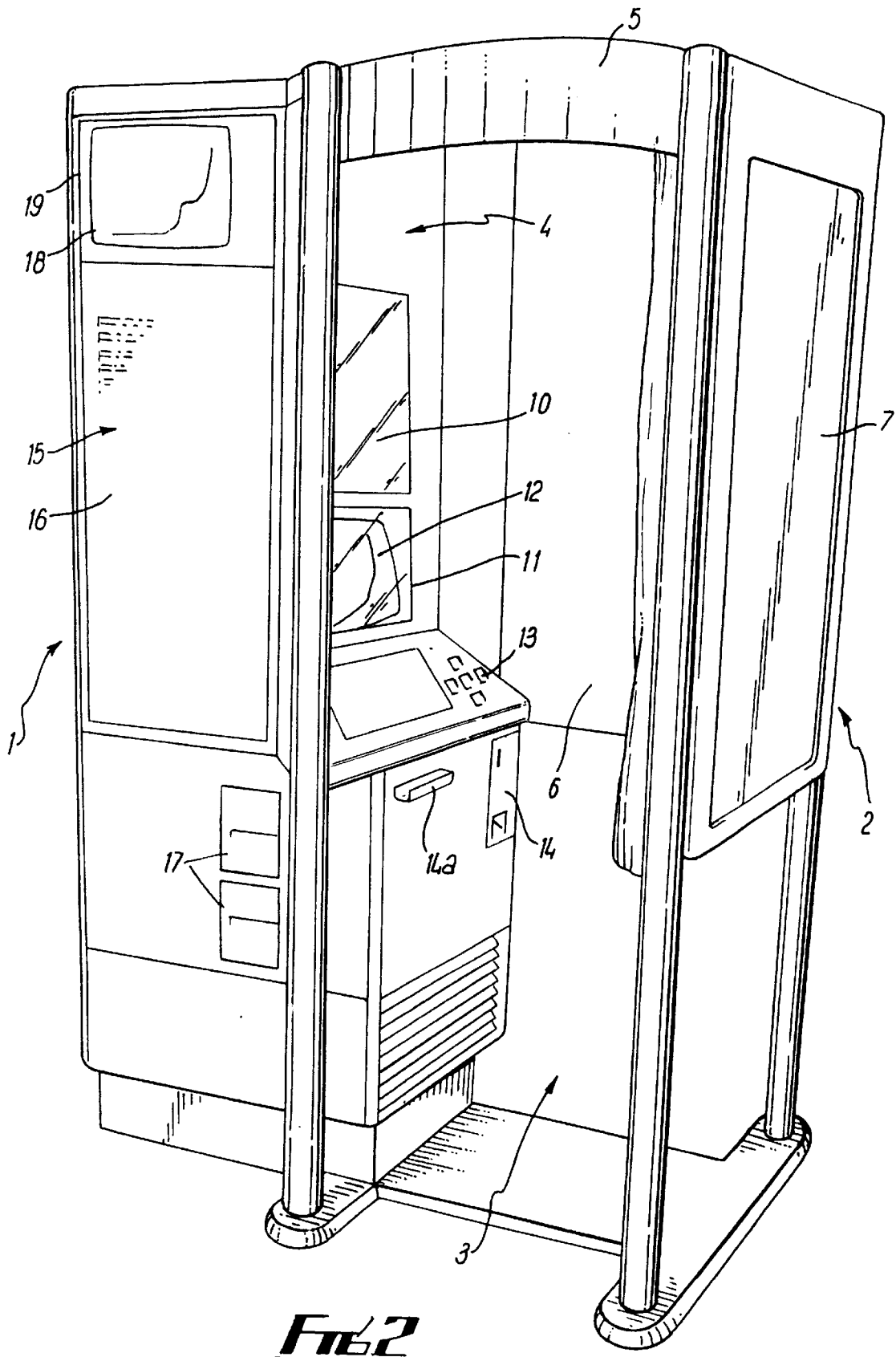
Figure 4:
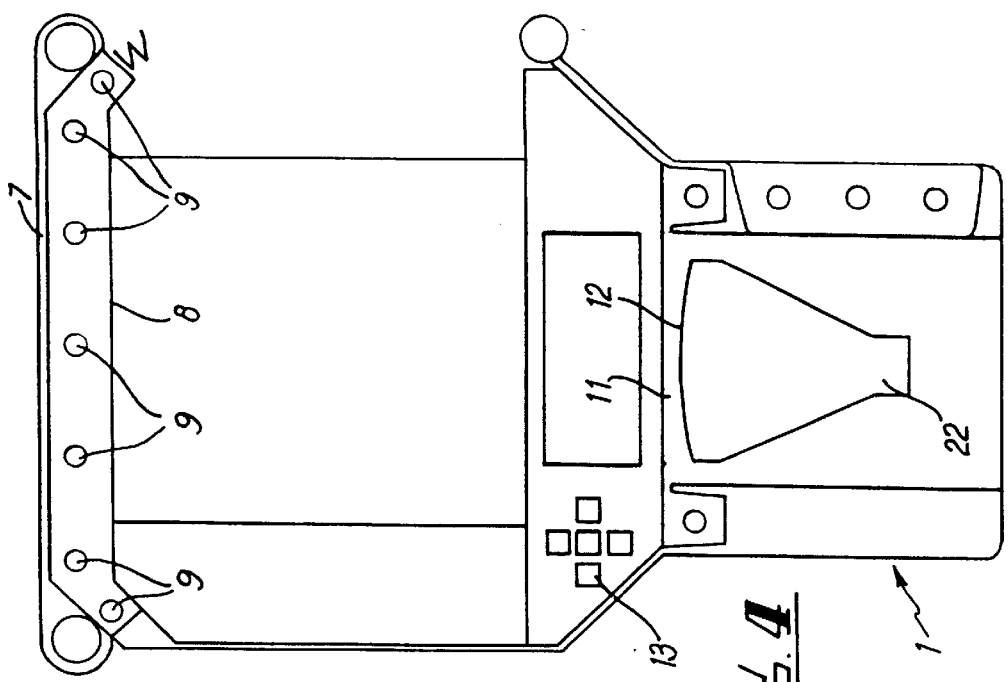
FIGS. 3 & 4 are diagrammatic sectional views of the machine.
Figure 3:
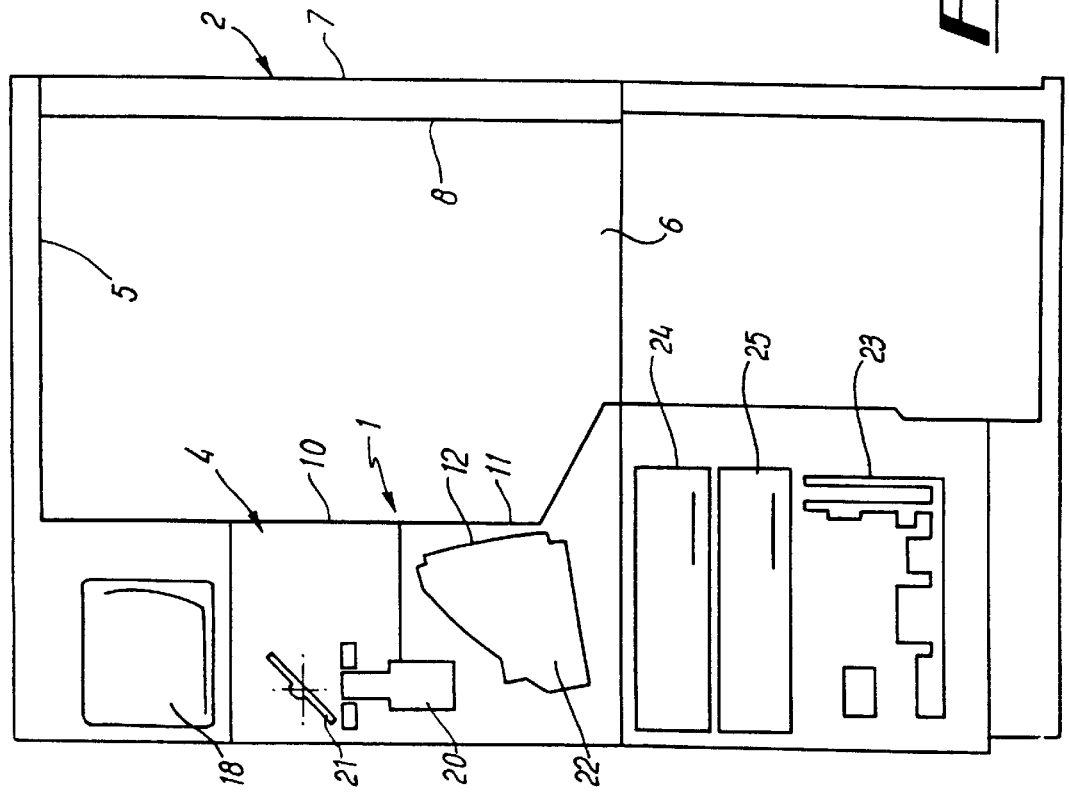
Figure 6:
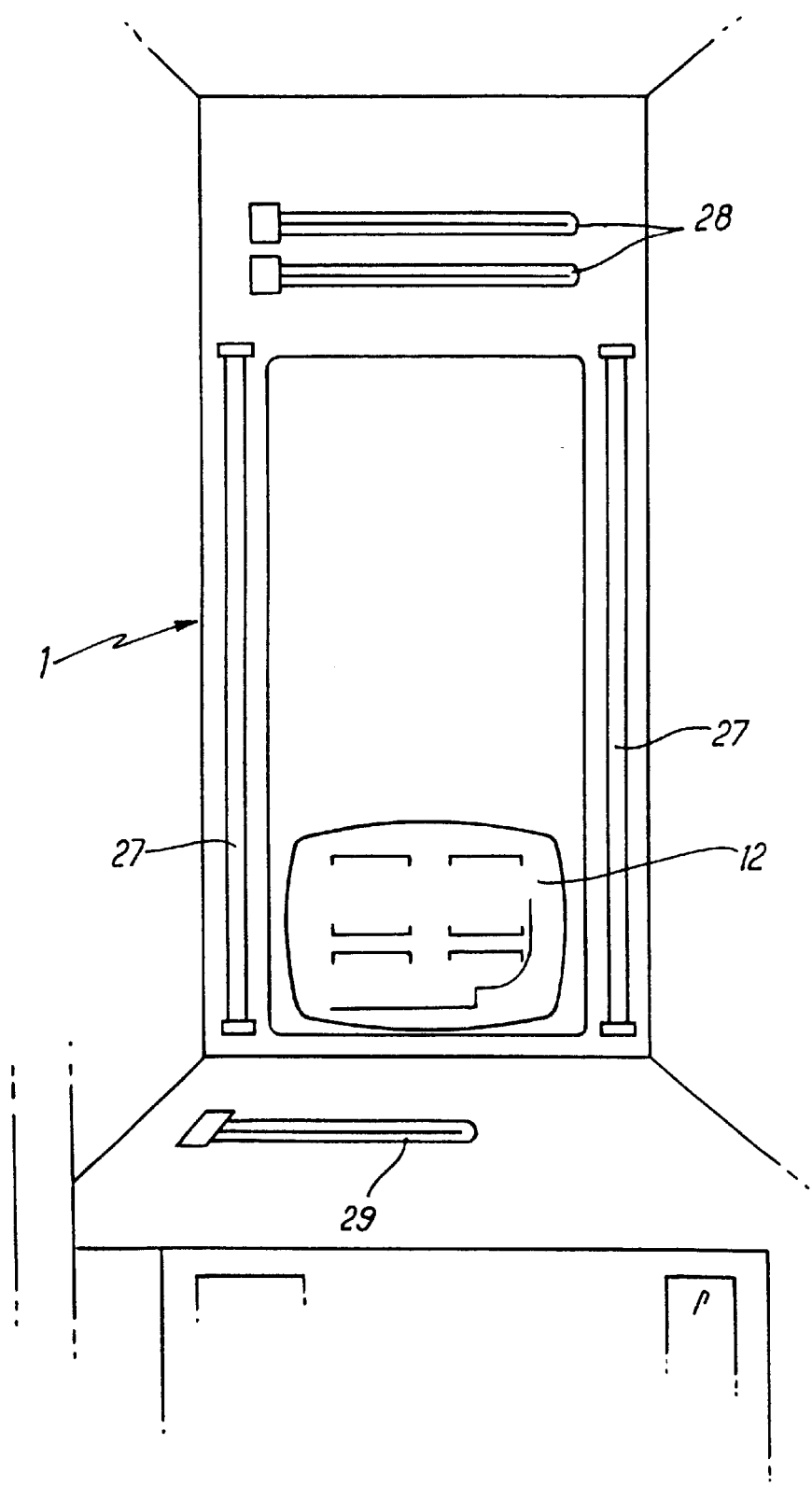
Figure 7:
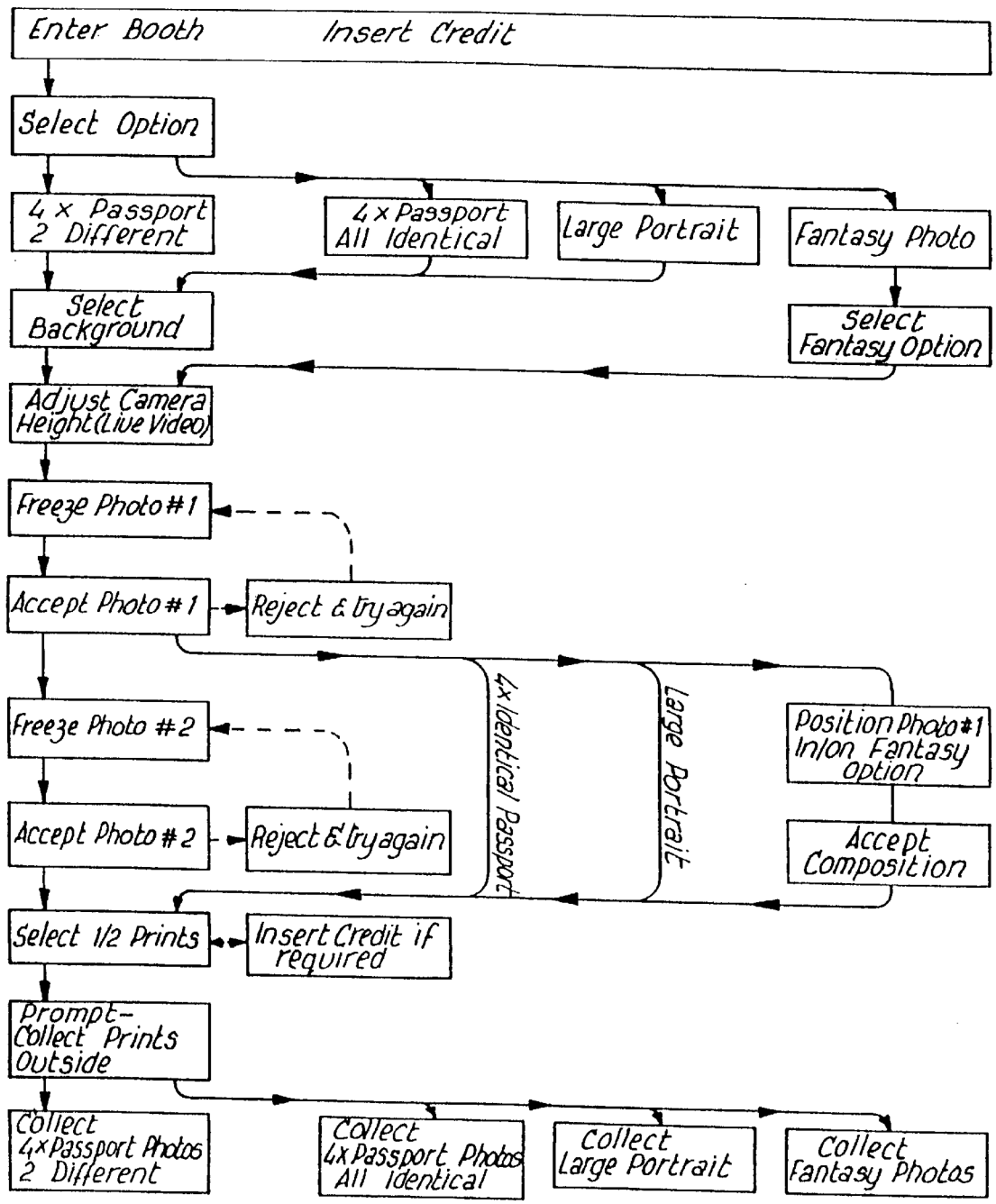
FIG. 7 is a flow diagram showing user operational procedure for the machine.

With reference to the drawings, the machine is in the form of a floor-standing booth and comprises an upstanding box structure 1, an upstanding rear wall 2 defining a picture taking zone 3 between such wall 2 and one wall 4 of the box structure 1, a roof 5 linking the tops of the rear wall 2 and the box structure 1, and a side wall 6 linking one side of the box structure 1 and the corresponding side edge of the rear wall 2 thereby to close one side of the picture taking zone 3. The opposite side of the picture taking zone 3 may be wholly open as shown, or there may be an openable closure arrangement such as a curtain or a door extending thereacross.

The picture taking zone 3 is dimensioned to allow at least one person to stand between the walls close to or in contact with the rear wall 2. The rear wall and the side wall are open at the lower part thereof i.e. from about waist height downwards. The rear wall comprises an outwardly facing opaque panel 7 and an inwardly facing translucent panel 8 formed from translucent Perspex of a 'pure' blue colouration (i.e. having predetermined narrow 'chroma key' colour characteristics). The panels 7, 8 are spaced apart and vertical fluorescent tubes 9 are provided therebetween to brightly and evenly back light the panel 8.

The wall 4 of the box-structure 1 facing the rear wall 2 contains centrally therein an opening covered with a glass panel 10 which is partially mirrored so that a proportion of light from the picture taking zone 3 incident on the mirrored panel 10 passes through and the rest of such light is reflected back into the zone 3.

The panel 10 is located generally in the middle of the wall 4, the centre of the panel approximately at the eye level of a person of average height in normal standing position.

Beneath the panel 10 there is a window 11 through which can be seen a VDU screen 12 which is inclined slightly upwardly. Beneath the screen 12 there are user controls 13, such as press buttons on a forwardly projecting surface, and beneath this there is a coin mechanism slot 14 (with an adjacent note acceptor slot 14a). The interior of the booth can be illuminated by lights 27, 28, 29 (e.g. flash light) at appropriately positioned upper and lower locations behind openings or transparent or translucent panels in the wall 4.

On a side wall 15 of the box structure 1 adjacent the open side of the picture taking zone 3, there is a large panel 16 containing information and/or advertising and beneath this there are outlets 17. There is also a second VDU screen 18 visible through a window 19 at the top of the panel 16. A loudspeaker of an audio system is mounted at a convenient position.

Within the box structure 1 there is a video camera 20 at a fixed position directed vertically upwards beneath a mirror 21 mounted to be pivotable about a horizontal axis. As shown the mirror 21 is at about 45° to the horizontal so that it directs light to the camera 20 received generally horizontally through the middle of the mirrored panel 10. Also, there is a coin mechanism behind the slot 14, crt equipment 22 providing the VDU screen 12, the audio system (not shown) a control apparatus 23, two printers 24, 25 arranged to feed printed material through the outlets 17 and a motor drive for pivoting the mirror 21.

The control apparatus 23 comprises a microprocessor based control system 26 which is connected to the camera 20, lighting 27-29 & 9, coin mechanism, printers 24, 25, audio system, crt equipment 22 and motor drive. As shown, the system includes devices 30 for processing color signals received from the camera 20, devices 31 for storing and processing image data, devices 32 for controlling feed of image data to the crt equipment 22 to be displayed on the VDU screen 12, hard disc data storage 33, and a floppy disc drive 34.

In use, a person enters the picture taking zone 3, and stands facing the mirrored panel 10. If his eyes are not level with the middle of the mirrored panel 10 he is required to adjust the picture-taking axis away from the horizontal by adjusting the angular position of the mirror, as described hereinafter.

The VDU screen 12 displays information, in accordance with a programmed 'idle mode' routine of the control system, which information indicates the availability of different picture taking procedures relating e.g. to 'fantasy', 'portrait', 'identical passport prints', 'passport prints (two different)'. The user is asked to press one of the user controls 13 to select the desired option and also he has to insert a coin or coins into the coin slot 14 to a value corresponding to his selection as displayed on the VDU screen 12. The external VDU 18 may display the same idle mode information. Alternatively it may display different information. The audio system may provide information, instructions, background sounds or music etc.

If any option other than fantasy is selected the user then has to select a background e.g. a plain color, textured background etc. The fantasy option is discussed later. The user then has to make a height adjustment. That is, a short time is allowed during which his picture, as taken with the camera is shown 'live' on the VDU screen 12 (but not the external screen) and he is given the opportunity of operating a user control 13 to move the mirror 21 and hence centre his image on the VDU screen 12.

The camera 20 and lighting arrangement 27-29 are then automatically actuated to cause a picture to be taken which is displayed frozen on the VDU screen 12. That is, the lighting arrangement 27-29 illuminates the user, and the camera 20 is actuated to take a picture of the user (head and shoulders portrait). There is then a pause during which the user can operated a control 13 to reject the picture and have another picture taken. The pause and the imminence of picture taking may be indicated on the VDU screen 12 e.g. by showing a representation of a count-down clock or the like.

When the user has obtained a picture to his liking (or two or more pictures if the 'different' option was selected) the video image data is stored in memory in the control apparatus 23 superimposed on the background (or backgrounds) already selected by the user or a neutral background if no selection was made. With regard to the background it will be understood that the pictures taken by the camera 20 include a backgound being the chroma key panel 8 of the back wall of the booth. This backgound is, however, removed from the profile of the user by electronic processing in known manner and is replaced with the selected (or default) plain background.

Once the final picture (or pictures) has been accepted by the user he is given the option of inserting more credit to obtain additional prints if he wishes.

The user is then asked, by instructions on the VDU screen 12, to leave the booth and wait outside to collect his prints. One of the printers 24, 25 is then actuated to produce the requisite color print or prints which are delivered within a short period of time to the user through one of the outlets 17 in the outer wall of the booth. During the short period when the user is waiting a further user can enter the booth and use the machine.

Each of the printers 24, 25 is a computer-controlled printer of the thermal dye transfer printer kind. The high resolution stored digital image data is fed to the printer (via appropriate decoding apparatus) to cause thermal 'points' to be actuated to cause small dots of colour to be transferred from a dye-carrying substrate onto appropriate print paper.

Thus, in known manner, a high resolution colour print generally of photographic quality is produced. When one printer runs out of material the other printer is then used.

If the user selects the 'fantasy' option, the procedure is as described above with the exception that, instead of selecting a plain background, the user has the option to select a background or foreground or supplementary picture from a range of entertaining representations. For example, the representations may comprise background geographical locations on which the person's image is to be superimposed, pictures of other persons etc. alongside which the persons image is to be displayed, or foreground pictures of scenes or persons with 'cut-outs' into which the image is to be inserted. In this respect, different representations for selection may be shown successively on the VDU screen 12, or the different representations may be shown simultaneously side by side to a smaller scale, or the representations may be selectable from an index etc. The representations are stored electronically on the hard disc and the stored data can be changed or updated as desired by insertion of data via the floppy disc drive.

Once a representation has been selected the user has the option of operating the user controls 13 to select the positioning of his picture profile against the representation and also to vary the scale by enlarging or reducing his profile relative to the representation as desired. A time limit may be imposed for this procedure.

After selection of the desired composition of profile and background or foreground representation and before printing, the user may be given other purchaseable options. For example, by insertion of a further coin or coins and operation of appropriate user controls 13 he may be able to obtain prints with further background compositions and/or he may be able to obtain an enlarged portrait print as well as or in addition to say four smaller prints.

With all of the selected options, as mentioned above, the user may be given a final option of purchasing further copies of produced prints.

With the embodiment described above it is possible to obtain high quality prints quickly and there is considerable scope for versatility. In so far as at least some stages in the described procedure require user operation of a control 13 to initiate the next stage, it can be convenient for there to be a change of user or a significant change of pose between pictures in the same credit operation.

It is of course to be understood that the invention is not intended to be restricted to the details of the above embodiments. Thus, for example, although the embodiments show a relatively direct path between the line of sight of the user and the camera 20 and the VDU screen 12, if desired mirrors may be used to give angular paths of a more complicated nature and this may be advantageous in so far as it is required to minimise a particular dimension or dimensions of the machine (e.g. the base area of the machine).

Moreover, with the above embodiment, the user inspects his image in the VDU 12 to determine his pose, but, if desired in a simplified version the arrangement may be such that he is required to set his pose solely by inspection of his image in the mirror 10. Where inspection of the image takes place on the VDU screen 12, the image may be shown on the screen as taken, or electronically reversed to simulate a mirror image as desired and a user control may be provided to switch between such options. If desired where the VDU screen 12 is used for pose composition, the mirror 10 can be omitted and replaced by an aperture or lens system etc.

The invention is not restricted to standing arrangements and a seat, preferably height adjustable may be provided in the booth if required. Also, an enclosed booth may not be essential and, especially if chroma keying is not required, it may be possible to use an open arrangement simply using a cabinet or console or column containing the camera and associated equipment and in front of which the subject stands or sits.

Instead of using the pivotable mirror 21 it is possible to use a camera which is movable up and down for height adjustment purposes. Illuminated markers or other devices may be used to indicate the correct positioning of the camera.

A single control may be used for camera height adjustment. Alternatively it is possible to use a row of buttons or other control devices, whereby the user operates the control device which is level with his eyes.

Instead of using an integrated structure it is possible to form the apparatus in two or more modules. In addition (or alternatively) to taking head and shoulders pictures the arrangement may be such that full length standing pictures or full seated pictures or any other pose can be taken.

As an additional feature, a symbol or device or wording may be provided at eye level behind the mirrored or reflective panel 10 or elsewhere to attract the subjects attention prior to or during picture taking. Thus, as shown in FIG. 5 there may be a symbol 35 such as an arrow on the front of the panel 10 and a symbol 36 behind the panel which is rendered visible by back illumination when the user operates the appropriate control to cause a picture to be taken, such illumination acting to attract the user's attention and ensure that he looks into the camera.

Instead of using an opaque panel 7 at the back of the booth, this may be translucent so that it is illuminated by the lamps 9, and advertisements can be provided on the outer surface thereof.

As an additional feature, the machine may have a security arrangement whereby the camera is used to record any attempt at tampering with the machine. Thus, where an attempt is made at unauthorised entry into the machine or the machine is struck or other destructive action is taken, the camera may operate automatically to take a picture of the picture-taking zone or a larger zone e.g. for a predetermined period of time or until the action ceases etc. Thus the machine may include sensors, timers etc. The output of the camera may be suitably recorded for authorised retrieval. Provision may be made for causing the camera to scan, or enlarge its field of vision etc.

What is claimed is:

1. An automatic picture taking system in the form of a photo booth comprising a housing, a background boundary surface, and a picture taking zone for accommodating a person defined between said housing and said background boundary surface, said housing containing:
    a) an electronic imaging camera which is operable when actuated to produce an image output in the form of storable electronic image data representative of an image of said person in said zone and said background boundary surface,
    b) a visual display device arranged to display a picture to said person in said zone,
    c) a printer arranged to produce a print of a picture displayed on said visual display device,
    d) processing means for receiving, and storing said image data produced by said camera and for automatically isolating the image data representing the image of said person from the image data representing the image of said background boundary surface,
    e) data storage means storing further data representing a plurality of userselectable supplementary images,
    f) combining means for automatically combining in a user-selectable mode said isolated image data representing the image of said person with said further data representing a user-selected supplementary image thereby to produce combined data representing a combination of said isolated image and said user-selected supplementary image,
    g) control means operable when actuated to initiate, prior to printing, automatic display for user selection on said visual display device of said image of said person, said plurality of supplementary images, and said combination of images, and to control operation of said printer,
    h) user controls operable by the person to effect selection of said person's image, selection of one of said supplementary images, and selection of one of a plurality of combination modes of the combined selected person's image and the selected supplementary image,
    wherein after actuation of said camera and said control means, said control means is operable to effect:
        i. display on said visual display device of said image of said person for acceptance or rejection by operation of said user controls,
        ii. display on said visual display device of said supplementary images for selection by operation of said user controls,
        iii. display on said visual display device of a combination of an accepted said image of said person and a selected said supplementary image in a mode of combination selected by operation of said user controls, and
        iv. operation of said printer to produce a print of said combination of images in said selected mode.

2. A system according to claim 1 wherein the printer is incorporated in the housing and a mechanism is provided for delivering prints therefrom to an outlet in the housing.

3. A system according to claim 1 wherein the printer is separate from the housing.

4. A system according to claim 1 wherein the housing has an upstanding box structure containing the camera behind a front wall formed to permit taking of a picture therethrough.

5. A system according to claim 1 wherein the camera is height adjustable.

6. A system according to claim 5 wherein the height adjustment is effected with a movable mirror.

7. A system according to claim 6 wherein the camera is directed upwardly and the movable mirror is pivotable about an angled position above the camera.

8. A system according to claim 5 wherein the housing is in the form of a console or booth with an adjacent floor area above which is located the picture taking zone, said floor area being a standing area whereby the system is adapted for the taking of a picture of a standing person.

9. A system according to claim 1 wherein the camera is a scanning video camera.

10. A system according to claim 1 wherein the printer is a digital data-controlled color printer.

11. A system according to claim 10 wherein the printer is a thermal dye transfer printer using heated points to transfer dots of colour from a substrate to print materials.

12. A system according to claim 1 wherein said selection of the combination mode enables the person to adjust the position and/or scale of said image of said person relative to said supplementary image.

13. A system according to claim 1 wherein said boundary surface is of predetermined chroma characteristics and said processing means for automatically isolating comprises a chroma key filter device for separating the person's profile from said background boundary surface in said image output of said camera.

14. A system according to claim 1 which is an automatic coin-operated system.

15. An automatic picture taking system in the form of a photo booth comprising a housing, a background boundary surface, and a picture taking zone for accommodating a person defined between said housing and said background boundary surface, said housing containing:
   a) an electronic imaging camera which is operable when actuated to produce an image output in the form of storable electronic image data representative of an image of said person in said zone,
   b) a visual display device arranged to display a picture to said person in said zone,
   c) a printer arranged to produce a print of a picture displayed on said visual display device,
   d) processing means for receiving, and storing said image data produced by said camera,
   e) data storage means storing further data representing a plurality of userselectable supplementary images,
   f) combining means for automatically combining in a user-selectable mode said image data representing the image of said person with said further data representing a userselected supplementary image thereby to produce combined data representing a combination of said image of said person and said user-selected supplementary image,
   g) control means operable when actuated to initiate, prior to printing, automatic display for user selection on said visual display device of said image of said person, said plurality of supplementary images, and said combination of images, and to control operation of said printer,
   h) user controls operable by the person to effect selection of one of said supplementary images, and selection of one of a plurality of combination modes of the combined selected person's image and the selected supplementary image,
   wherein after actuation of said camera and said control means, said control means is operable to effect:
      i. display on said visual display device of said supplementary images for selection by operation of said user controls,
      ii. display on said visual display device of a combination of an image of said person and a selected said supplementary image for selection or rejection by operation of said user controls, and
      iii. operation of the printer to produce a print of a selected combination of images.

16. An automatic picture taking system in the form of a photo booth comprising a housing, a background boundary surface, and a picture taking zone for accommodating a person defined between said housing and said background boundary surface, said housing containing:
   a) an electronic imaging camera which is operable when actuated to produce an image output in the form of storable electronic image data representative of an image of said person in said zone,
   b) a visual display device arranged to display a picture to said person in said zone,
   c) an image output device for producing an output of combined images displayed on said visual display device in the form of a print. a video recording or a digital recording,
   d) processing means for receiving, and storing said image data produced by said camera,
   e) data storage means storing further data representing a plurality of userselectable supplementary images,
   f) combining means for automatically combining in a user-selectable mode said image data representing the image of said person with said further data representing a userselected supplementary image thereby to produce combined data representing a combination of said image of said person and said user-selected supplementary image,
   g) control means operable when actuated to initiate, prior to producing an output of combined images in the form of a print a video recording or a digital recording, automatic display for user selection on said visual display device of said image of said person, said plurality of supplementary images, and said combination of images, and to control operation of said image output device,
   h) user controls operable by the person to effect selection of one of said supplementary images, and selection of one of a plurality of combination modes of the combined selected person's image and the selected supplementary image,
   wherein after actuation of said camera and said control means, said control means is operable to effect:
      i. display on said visual display device of said supplementary images for selection by operation of said user controls,
      ii. display on said visual display device of a combination of an image of said person and a selected said supplementary image for selection or rejection by operation of said user controls, and
      iii. operation of the image output device to produce an output of combined images in the form of a print, a video recording or a digital recording, of a selected combination of images.

17. A system according to claim 16 wherein said image output device is selected from static or moving video or digital recordings.

18. A system according to claim 17 wherein said image output device is a video tape.

19. A system according to claim 18 wherein said image output device is a computer disk.

20. A system according to claim 19 wherein said image output device device is a color printer.

21. An automatic picture taking system as claimed in claim 16 wherein said image of said person is shown live on said visual display device.

22. An automatic picture taking system as claimed in claim 16 wherein a plurality of user selectable supplementary images are simultaneously displayed on said visual display device and said user controls are operable by said person to select a supplementary image while it is displayed on said visual display device.

23. An automatic picture taking system as claimed in claim 16 wherein a plurality of combinations of said image of said person and said supplementary images are shown on said visual display device.

24. An automatic picture taking system as claimed in claim 16 wherein a plurality of user selectable supplementary images are displayed on said visual display device successively, and said user controls are operable by said person to select a supplementary image while it is displayed on said visual display device.

25. An automatic picture taking system as claimed in claim 16 wherein said user controls are operable by the person to effect selection of at least one image of said person for combination with different supplementary images and/or to effect selection of a supplementary image for combination with different images of said person.

26. An automatic picture taking system as claimed in claim 16 wherein said user controls are operable by said person to select or reject an image of said person to be combined with a user-selected supplementary image from a plurality of images of said person.

27. An automatic picture taking system in the form of a photo booth comprising a housing, a background boundary surface, and a picture taking zone for accommodating a person defined between said housing and said background boundary surface, said housing containing:
  a) an electronic imaging camera which is operable when actuated to produce an image output in the form of storable electronic image data representative of an image of said person in said zone,
  b) a visual display device arranged to display a picture to said person in said zone,
  c) a print output device arranged to produce a print output of a picture displayed on said visual display device,
  d) processing means for receiving, and storing said image data produced by said camera,
  e) data storage means storing further data representing a plurality of userselectable supplementary images,
  f) combining means for automatically combining in a user-selectable mode said image data representing the image of said person with said further data representing a userselected supplementary image thereby to produce combined data representing a combination of said image of said person and said user-selected supplementary image,
  g) control means operable when actuated to initiate, prior to producing a print output, automatic display for user selection on said visual display device of said image of said person, said plurality of supplementary images, and said combination of images, and to control operation of said print output device,
  h) user controls operable by the person to effect selection of one of said supplementary images, selection of one of a plurality of combination modes of the combined selected person's image and the selected supplementary image, and to effect entry of information for inclusion in said print output,
  whereby after actuation of said camera and said control means, said control means is operable to effect:
    i. display on said visual display device of said supplementary images for selection by operation of said user controls,
    ii. display on said visual display device of a combination of an image of said person and a selected said supplementary image for selection or rejection by operation of said user controls, and
    iii. operation of the print output device to produce a print output of a selected combination of images.

28. An automatic picture taking system as claimed in claim 27, wherein said entry of information for inclusion in said print output is by a keyboard.

29. An automatic picture taking system in the form of a photo booth comprising a housing, a background boundary surface, and a picture taking zone for accommodating a person defined between said housing and said background boundary surface, said housing containing:
  a) an electronic imaging camera which is operable when actuated to produce an image output in the form of storable electronic image data representative of an image of said person in said zone,
  b) a visual display device arranged to display a picture to said person in said zone,
  c) a print output device arranged to produce a print output of a picture displayed on said visual display device,
  d) processing means for receiving, and storing said image data produced by said camera,
  e) data storage means storing further data representing a plurality of userselectable supplementary images or backgrounds,
  f) combining means for automatically combining in a user-selectable mode said image data representing the image of said person with said further data representing a userselected supplementary image or background thereby to produce combined data representing a combination of said image of said person and said user-selected supplementary image or background,
  g) control means operable when actuated to initiate, prior to producing a print output, automatic display for user selection on said visual display device of said image of said person, said plurality of supplementary images or backgrounds, and said combination, and to control operation of said print output device,
  h) user controls operable by the person to effect selection of one of said supplementary images or backgrounds, and selection of one of a plurality of combination modes of the combined selected person's image and the selected supplementary image or background,
  whereby after actuation of said camera and said control means, said control means is operable to effect:
    i. display on said visual display device of said supplementary images or backgrounds for selection by operation of said user controls,
    ii. display on said visual display device of a combination of an image of said person and a selected said supplementary image or background for selection or rejection by operation of said user controls, and
    iii. operation of the print output device to produce a printout of a selected combination of an image of said person and a supplementary image or background, wherein said printout is a postcard, an enlarged portrait print, identification card, or a plurality of identical or non-identical passport size pictures.

30. An automatic picture taking system as claimed in claim 29 wherein said image of said person is shown live on said visual display device.

31. An automatic picture taking system as claimed in claim 29 wherein a plurality of user selectable supplementary images or backgrounds are simultaneously displayed on said visual display device and said user controls are operable by said person to select a supplementary image or background while it is displayed on said visual display device.

32. An automatic picture taking system as claimed in claim 29 wherein a plurality of combinations of said image of said person and said supplementary images or backgrounds are shown on said visual display device.

33. An automatic picture taking system in the form of a photo booth comprising a housing, a background boundary surface, and a picture taking zone for accommodating a person defined between said housing and said background boundary surface, said housing containing:
  a) an electronic imaging camera which is operable when actuated to produce an image output in the form of storable electronic image data representative of an image of said person in said zone, b) a visual display device arranged to display a picture to said person in said zone, c) a print output device arranged to produce a print output of a picture displayed on said visual display device, d) processing means for receiving, and storing said image data produced by said camera, e) data storage means storing further data representing a plurality of userselectable supplementary images, f) combining means for automatically combining in a user-selectable mode said image data representing the image of said person with said further data representing a userselected supplementary image thereby to produce combined data representing a combination of said image of said person and said user-selected supplementary image, g) control means operable when actuated to initiate, prior to producing a print output, automatic display for user selection on said visual display device of said image of said person, said plurality of supplementary images, and said combination of images, and to control operation of said print output device, h) user controls operable by the person to effect selection of one of said supplementary images, selection of one of a plurality of combination modes of the combined selected person's image and the selected supplementary image, and to effect modification of said selected person's image, whereby after actuation of said camera and said control means, said control means is operable to effect:

i. display on said visual display device of said supplementary images for selection by operation of said user controls, ii. display on said visual display device of a combination of an image of said person and a selected said supplementary image for selection or rejection by operation of said user controls, and iii. operation of the print output device to produce a print output of a selected combination of images.

34. An automatic picture taking system as claimed in claim 33, wherein said modification of said selected person's image comprises adjusting the position and/or scale of said selected person's image relative to said supplementary image.

35. An automatic picture taking system as claimed in claim 33, wherein said modification of said selected person's image comprises distorting of said selected person's image.

36. An automatic picture taking system as claimed in claim 33, wherein said modification of said selected person's image comprises removal of portions of said selected person's image.

* * * * *